US012742134B2

(12) United States Patent
Arredondo et al.

(10) Patent No.: US 12,742,134 B2
(45) **Date of Patent: *Sep. 22, 2026**

(54) BLENDS OF N-ACYL ALANINATES AND OTHER N-ACYL AMINO ACID SURFACTANTS AND DERIVATIVES THEREOF

(71) Applicant: The Procter & Gamble Company, Cincinnati, OH (US)

(72) Inventors: Victor Manuel Arredondo, West Chester, OH (US); Karunakaran Narasimhan, Mason, OH (US); Howard David Hutton, III, Oregonia, OH (US)

(73) Assignee: THE PROCTER & GAMBLE COMPANY, Cincinnati, OH (US)

(*) Notice: Subject to any disclaimer, the term of this patent is extended or adjusted under 35 U.S.C. 154(b) by 783 days.

This patent is subject to a terminal disclaimer.

(21) Appl. No.: 17/835,079

(22) Filed: Jun. 8, 2022

(65) Prior Publication Data

US 2022/0403291 A1 Dec. 22, 2022

Related U.S. Application Data

(60) Provisional application No. 63/208,012, filed on Jun. 8, 2021.

(51) Int. Cl.
*C11D 1/00* (2006.01)
*C11D 1/52* (2006.01)
*C11D 3/33* (2006.01)

(52) U.S. Cl.
CPC ................ *C11D 1/528* (2013.01); *C11D 3/33* (2013.01)

(58) Field of Classification Search
CPC .................................... C11D 3/33; C11D 1/50
See application file for complete search history.

(56) References Cited

U.S. PATENT DOCUMENTS

| | | | | |
|---|---|---|---|---|
| 3,152,947 | A | 10/1964 | Alexander et al. | |
| 4,380,646 | A | 4/1983 | Franzmann | |
| 5,496,959 | A | 3/1996 | Day | |
| 5,856,538 | A | 1/1999 | Strecker | |
| 6,028,042 | A | 2/2000 | Chambers et al. | |
| 10,988,713 | B2 * | 4/2021 | Schilling ............ | C11D 3/38663 |
| 2003/0181341 | A1 | 9/2003 | Yoshimi | |
| 2010/0273879 | A1 | 10/2010 | Klug et al. | |
| 2013/0189212 | A1 * | 7/2013 | Jawale ..................... | A61Q 5/02 514/552 |
| 2014/0213665 | A1 | 7/2014 | Klug et al. | |
| 2015/0126776 | A1 | 5/2015 | Wang | |
| 2015/0141682 | A1 | 5/2015 | Koshti | |
| 2015/0250694 | A1 | 9/2015 | Koshti et al. | |
| 2016/0152555 | A1 | 6/2016 | Wang et al. | |
| 2024/0209282 | A1 | 6/2024 | Arredondo | |

FOREIGN PATENT DOCUMENTS

| | | | |
|---|---|---|---|
| CN | 102311359 | A | 1/2012 |
| CN | 105802746 | A | 7/2016 |
| CN | 106076192 | A | 11/2016 |
| CN | 106478466 | A | 3/2017 |
| CN | 107353223 | A | 11/2017 |
| CN | 107382763 | A | 11/2017 |
| CN | 108619027 | A | 10/2018 |
| KR | 20180028207 | A | 3/2018 |
| RU | 2657243 | C2 | 6/2018 |
| WO | 9507881 | A1 | 3/1995 |
| WO | 9507882 | A1 | 3/1995 |
| WO | 9533030 | A1 | 12/1995 |
| WO | 9741095 | A1 | 11/1997 |
| WO | 2011130460 | A1 | 10/2011 |
| WO | 2014008103 | A1 | 1/2014 |
| WO | 2015026538 | A1 | 2/2015 |
| WO | 2022117415 | A1 | 6/2022 |

OTHER PUBLICATIONS

PCT Search Report and Written Opinion for PCT/US2022/072804 dated Oct. 21, 2022, 16 pages.
All Office Actions: U.S. Appl. No. 17/835,025, filed on Jun. 8, 2022.
Unpublished U.S. Appl. No. 17/835,025, filed Jun. 8, 2022, to Victor Manuel Arredondo et al.
All Office Actions; U.S. Appl. No. 18/530,397, filed Dec. 6, 2023.

* cited by examiner

*Primary Examiner* — Necholus Ogden, Jr.
(74) *Attorney, Agent, or Firm* — Matthew J. Spegele

(57) ABSTRACT

A surfactant composition includes a homogeneous mixture of greater than 70%, by weight, of N-acyl alaninate surfactant of formula (I) and an N-acyl amino acid surfactant of formula (II). A process for preparation of a blend of an N-acyl alaninate surfactant and an N-acyl amino acid surfactant includes combining (a) an alanine amino acid and (b) other amino acid, an anhydrous alkali salt of the other amino acid, or both, a waterless base, and a fatty alkyl ester of formula (V) to form a mixture including alanine amino acid salt of formula (III), and other amino acid salt of formula (IV). The process further includes increasing the temperature of the mixture to 180° C. or less to form a reaction mixture. The process further includes continuously removing alkyl alcohol from the reaction mixture and allowing the reaction mixture to become substantially clear to form the blend.

12 Claims, No Drawings

BLENDS OF N-ACYL ALANINATES AND OTHER N-ACYL AMINO ACID SURFACTANTS AND DERIVATIVES THEREOF

FIELD

The present disclosure relates generally to N-acyl alaninates and derivatives and N-acyl alaninate blend compositions with reduced amounts of impurities.

BACKGROUND

Surfactants are the single most important cleaning ingredient in cleaning products. Environmental regulations, consumer habits, and consumer practices have forced new developments in the surfactant industry to produce lower cost, higher-performing, and environmentally friendly products.

Surfactants are key ingredients playing important roles in a variety of applications and consumer products such as in detergents, hard surface cleaners, fabric softeners, body wash, face wash, shampoo conditioners, conditioning shampoos, and other surfactant-based compositions.

SUMMARY

Many catalogs and patents describe surfactant options that can be too expensive to use. The high cost is many times due to the starting materials used to make such surfactants, inefficient reaction schemes and/or complex processes required for their manufacture to meet specific quality attributes. Accordingly, new methods are needed to produce surfactant compositions at low cost containing minimal impurities or additives.

Today, cleaning products are designed by formulators typically with two or more surfactants in their composition to do multiples jobs. Chiefly among them to clean by facilitating the removal of soils from the treated surface or substrate. Unfortunately, in any cleaning product a surfactant can also act to remove good things from the skin as well, like lipid, when it comes in contact with it. The lipid on the skin helps, for example, to protect it from losing too much moisture. Removal of too much lipid can leave the skin vulnerable to becoming dry. One solution for this problem is to utilize milder surfactants. Another solution is to replace what is removed by depositing a benefit material on the skin. Amino acid-based surfactants are generally mild towards skin. The degree of mildness can depend upon the specific nature of the amino acid and other factors such as the solution pH and the presence of other co-surfactants. There are several in-vivo and ex-vivo methods to assess the relative mildness of surfactants. One such method measures the ability of a surfactant to dissolve zein, a corn protein. Results from this method have been correlated with its skin irritation potential. Based on these results all amino acid-based surfactants are milder than the harsh benchmark sodium lauryl sulfate (SLS). Other work has shown that the tendency of surfactants to cause protein denaturation and skin irritation is linked to the charge density of surfactant micelles. It is believed that when charged surfactants bind to proteins, they form micelle-like structures on their backbone and cause either denaturation or swelling that in turns results in enhanced penetration of surfactants into deeper layers of the skin resulting in a biological reaction that manifests as irritation. Research has shown that sodium laurate, the main active in soap bars, was found to cause the most damage when determining the Franz cell penetration of methyl paraben into skin. SLS caused less damage than sodium laurate, and the evaluated N-acyl amino acid surfactants, namely alkali metal salts of N-acyl alaninate, N-acyl sarcosinate, N-acyl glycinate, N-acyl glutamate, acyl N-methyl taurates, and acyl taurates were not found to cause any damage and are known "mild" surfactants available to formulators.

Among these mild surfactants, taurates are slightly-to-moderately soluble in water. For example, the solubility of sodium N-methyl cocoyl taurate in water is reported to be 10 grams per liter at 20° C. This surfactant is commercially available as a 30% solids paste which can pose some handling challenges and can make incorporation into formulation more difficult or require solubilization into an aqueous medium using other surfactant that might be part of the same formulation or not. The water solubility of its unmethylated counterpart, cocoyl taurate, is less. In contrast N-cocoyl alaninate, N-cocoyl glycinate, N-cocoyl glutamate and N-lauroyl sarconsinate surfactants exhibit higher water solubility and are sold as 30% solid clear, liquid aqueous solutions.

N-acyl alaninates (and other amino acid-based) surfactants can be commercially manufactured from the corresponding fatty acid chlorides and amino acids using Schotten Baumann chemistry as shown in equation 1.

equation 1

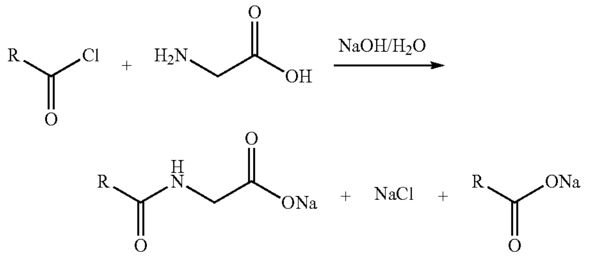

This amidation reaction is typically carried out in water, but the use of mixed water-solvent systems has been reported. Typically, the sodium N-acyl amino acid surfactant formed is obtained in the form of an aqueous composition containing 20-30% active with invariably high levels of undesirable inorganic salt (NaCl). The latter can be removed via additional post-reaction steps that can add significant cost and process complexity. This surfactant making method is expensive and requires the manufacture of fatty acid chlorides which uses chlorinating agents such as phosphorous trichloride, ($PCl_3$), phosphorous pentachloride ($PCl_5$), thionyl chloride ($SOCl_2$), oxalyl chloride $(COCl)_2$ or phosgene (poisonous gas). These chlorinating agents are quite reactive, can be toxic, might require very special handling and metallurgy. Also, depending on the specific chemistry and process used, separating the fatty acid chlorides away from byproducts and catalysts used has been difficult to solve. Thus, the products may contain undesired impurities that can be carried through to the synthesis of the corresponding surfactant.

One attempt to overcome these deficiencies is the synthesis of N-acyl glycinates and N-acyl alaninates by reacting corresponding amino acids with the fatty acid itself. The process generated highly colored (yellow) surfactant compositions containing relative high level of acylated di- and tri-peptide by-products with significant levels of unreacted fatty acid. Further, 100 to 200% mole excess of fatty acid is required for this process.

The preparation of N-acyl taurates (or N-acyl taurides as named by others) has also been reported to occur by the direct condensation of carboxylic acid with taurines (2-aminoalkane sulfonic alkali salts) as shown in equation 2. For this reaction to take place, however, the removal of water and the use of high temperatures and an inert atmosphere is necessary. This direct amidation reaction can be carried out in the presence of a catalyst such as zinc oxide, hypophosphorous acid, boric acid and others. Decomposition byproducts have been reported resulting in poor product yields, and unacceptable product discoloration and odor. Typically, the carboxylic acid is said to be used in ≥30 molar excess relative to the taurine. To produce an N-acyl taurate which is free from fatty acid though this chemical approach, the crude reaction mixture is subjected to additional processing steps such as distillation, extraction, recrystallization, or combinations thereof.

equation 2

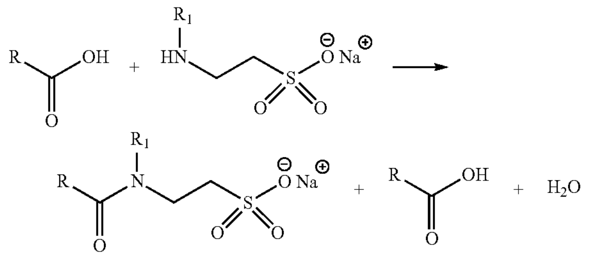

Fatty alkyl esters have also been used as starting materials. For example, methyl laurate can be reacted with the sodium salt of an amino acid and sodium methoxide in methanol in a pressurized reactor, with reaction pressures varied from 5-50 psig depending on the reaction temperature. Conversion to N-acyl sarcosinate from this reaction can be only 22%, while N-acyl alaninate conversion can be 67%. The N-acyl amino acid surfactant formed can be isolated by adding more methanol to the crude reaction mixture, then filtering it off and washing solid obtained with more methanol and finally drying isolated surfactant in the oven. The filtrate can be concentrated and analyzed to determine proportions of methyl laurate, and/or sodium salt of amino acid, and can be reused in the following batch. Hence, a further disadvantage of this approach is that it requires several process steps to isolate the reaction product.

In yet another conventional reaction, N-acyl amino acid surfactant is prepared using a polyol at 50-70 wt. % of the combined mass of the amino acid salt plus the methyl ester. However, the polyols used, glycerol and/or propylene glycol, remain in the final product mixture. Di-peptide impurities are found in the surfactant composition and the level varies depending on the level of polyol used in the reaction.

There is a need to design and create mild cleaning products that can come in contact with skin, hair and other irritable body parts (e.g. eyes, nose) when in use. Typically, these formulations require the use of 2 or more mild surfactants that are easy to dose into the cleaning formulation. There is also a need for N-acyl alaninates and N-acyl taurate compositions produced with low proportion of byproducts and impurities and low levels of solvents or additives.

The present disclosure addresses these needs by providing surfactant compositions including a homogeneous mixture of greater than 70%, by weight, of N-acyl alaninate surfactant of formula (I) and an N-acyl amino acid surfactant of formula (II). Formulas (I) and (II) are provided below.

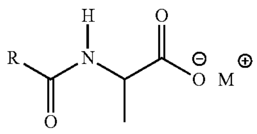

(I)

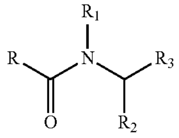

(II)

R is an $C_5$-$C_{21}$ alkyl substituent, $R_1$ represents H, or $C_1$ to $C_4$ alkyl radical, $R_2$ represents H, $C_1$ to $C_4$ alkyl radical, or $C_1$ to $C_4$ hydroxyalkyl, $R_3$ represents the functional moieties COOM and $CH_2$—$SO_3M$, and M is a cationic group selected from the group consisting of alkali metal salts and hydrogen. The surfactant compositions are substantially free of solvent and NaCl.

The present disclosure further relates to a process for preparation of a blend of an N-acyl alaninate surfactant and an N-acyl amino acid surfactant. The process includes combining (a) an alanine amino acid and (b) other amino acid, an anhydrous alkali salt of the other amino acid, or both, a waterless base, and a fatty alkyl ester of formula (V) to form a mixture. The mixture includes alanine amino acid salt of formula (III) and other amino acid salt of formula (IV). Formulas (III), (IV), and (V) are shown below.

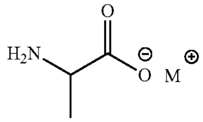

(III)

M is a cationic group selected from alkali metal salts

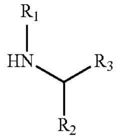

(IV)

$R_1$ represents H, or $C_1$ to $C_4$ alkyl radical, $R_2$ represents H, $C_1$ to $C_4$ alkyl radical or $C_1$ to $C_4$ hydroxyalkyl, $R_3$ represents the functional moieties COOM and $CH_2$—$SO_3M$, and M is a cationic group selected from alkali metal salts

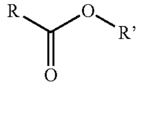

(V)

R is selected from an $C_5$-$C_{21}$ alkyl substituent and R' is a $C_1$ or higher alkyl substituent, preferably methyl.

The process further includes increasing the temperature of the mixture to 180° C. or less, preferably 160° C. or less, more preferably 150° C. or less to form a reaction mixture, continuously removing alkyl alcohol from the reaction mixture, and allowing the reaction mixture to become substantially clear to form the blend.

In another aspect, the present disclosure is directed to a consumer product cleaning or personal care composition comprising about 0.001 wt. % to about 99.999 wt. %, preferably about 0.1 wt % to about 80 wt. % of homogeneous mixtures of N-acyl alaninates and other N-acyl amino acid surfactant, as described herein, based on the total weight of the composition, and 0.001 wt. % to about 99.999 wt. % of one or more additional cleaning components, or one or more additional personal care components.

DETAILED DESCRIPTION

Features and benefits of the present disclosure will become apparent from the following description, which includes examples intended to give a broad representation of the present disclosure. Various modifications will be apparent to those skilled in the art from this description and from practice of the present disclosure. The scope is not intended to be limited to the particular forms disclosed and the present disclosure covers all modifications, equivalents, and alternatives falling within the spirit and scope of the present disclosure as defined by the claims.

As used herein, the articles including "the," "a" and "an" when used in a claim or in the specification, are understood to mean one or more of what is claimed or described.

As used herein, the terms "include," "includes" and "including" are meant to be non-limiting.

The term "substantially free of" or "substantially free from" as used herein refers to either the complete absence of an ingredient or a minimal amount thereof merely as impurity or unintended byproduct of another ingredient. A composition that is "substantially free" of/from a component means that the composition comprises less than about 0.5%, 0.25%, 0.1%, 0.05%, or 0.01%, or even 0%, by weight of the composition, of the component.

As used herein, the term "solid" includes granular, powder, flakes, noodles, needles, extrudates, ribbons, beads and pellets product forms and comprise less than about 0.5%, 0.25%, 0.1%, 0.05%, or 0.01%, or even 0%, by weight of the composition, of the water.

As used herein "homogeneous" refers to a mixture made up of two or more different substances in which their chemical identity is retained and the composition is uniform throughout the mixture.

As used herein "clear mixture" refers to a mixture of two or more chemicals that appears as one-phase, which is free of a separated phase.

As used herein, "personal cleansing composition" includes personal cleansing products such as shampoos, conditioners, conditioning shampoos, shower gels, liquid hand cleansers, facial cleansers, and other surfactant-based liquid compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

In this description, all concentrations are on a weight basis of the composition, unless otherwise specified.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

N-Acyl Alaninate Surfactant Blend Compositions

The surfactants in the homogeneous N-acyl alaninate blend compositions disclosed herein have the following general formulas (I) and (II):

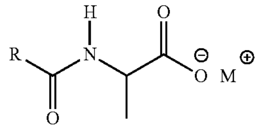

(I)

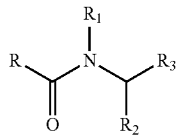

(II)

where R is an $C_5$-$C_{21}$ alkyl substituent, $R_1$ represents H, or $C_1$ to $C_4$ alkyl radical, $R_2$ represents H, $C_1$ to $C_4$ alkyl radical, or $C_1$ to $C_4$ hydroxyalkyl, $R_3$ represents the functional moieties COOM and $CH_2$—$SO_3M$, and M is a cationic group selected from the group consisting of alkali metal salts and hydrogen. Preferably, R is a $C_{7-17}$ alkyl substituent. The alkyl substituent may be branched or unbranched and preferably is unbranched.

The surfactants in the N-acyl alaninate blends described herein are typically not single compounds as suggested by their general formula (I) and (II), but rather, as one skilled in the art would readily appreciate, they comprise a mixture of several homologs having varied chain lengths and molecular weight. The alkyl chains on the surfactants in the N-acyl alaninate blends described herein may be either saturated or unsaturated, preferably saturated.

The homogeneous N-acyl alaninate surfactant blend composition of the present disclosure comprises at least 50% by weight of the combined homogeneous blend of surfactants of formula (I) and (II). The composition preferably comprises from 70-95% by weight of said combined homogeneous blend of surfactants of formula (I) and (II). For example, the composition of the present disclosure may comprise 70% by weight, preferably greater than 75% by weight, and more preferably greater than 85% by weight of the mixture of N-acyl alaninate of formula (I) and N-acyl amino acid surfactant of formula (II) combined, specifically reciting all values within these ranges and any ranges created thereby.

The homogeneous N-acyl alaninate surfactant blend composition of the present disclosure further comprises fatty acid. The fatty acid may be present as free fatty acid or in the form of fatty acid soap. The amount in the composition may range from 1 to about 10% by weight, preferably from 2 to 7% by weight, and more preferably from 3-5% by weight, specifically reciting all values within these ranges and any ranges created thereby.

Beneficially, the homogeneous N-acyl alaninate surfactant blend composition of the present disclosure may be substantially free of impurities including water, salt (NaCl), polyol solvents, acylated di- and tri-peptide by-products, and methanol. The composition of the disclosure may comprise less than 5%, 2%, 1%, 0.1%, substantially free, and in some particularly preferred, free of one or any combination of these impurities.

The present disclosure further encompasses concentrated compositions, often referred to as pastes, and also solids, such as powders and tablets. These concentrated compositions may be combined with various adjunct ingredients (for example, water) to make a variety of detergent products, including personal cleansing compositions and laundry detergents.

Typically, inorganic salt (NaCl) is added to cleansing formulations made with sulfated surfactants to thicken the product. It has been surprisingly found that adding inorganic salt to the formulas that are substantially free of sulfate containing surfactants and/or using high inorganic salt containing sulfate-free surfactants in the presence of cationic conditioning polymer can cause product instability due to formation of a gel-like surfactant-polymer complex in the composition. Thus, it is desirable to avoid or minimize adding NaCl to the formula and/or use low inorganic salt (NaCl) containing raw materials. Commercially available sulfate free surfactants such as sodium cocoyl alaninate, sodium N-methyl cocoyl taurate, sodium cocoyl glycinate and other amino acid-based surfactants, typically come with high levels of inorganic salt such as 5% or higher. Use of these high salt-containing (such as, NaCl) raw materials in sulfate-free surfactant-based cleaning formulations can cause formation of undesired gel-like surfactant-polymer complex in the product before use. The surfactant composition of the present disclosure described herein can enable the formulation of stable cleansing products substantially free of sulfate containing surfactants.

Process of Making Homogeneous N-Acyl Alaninate Surfactant Blend Compositions

The process described herein allows for the preparation of homogeneous N-acyl alaninate surfactant blends having low levels of impurities. The conventional Schotten-Baumann acid chloride route to N-acyl alaninates, and other amino acid surfactants—generates NaCl and other impurities, thereby yielding an undesirable output. Further, other reactions for making N-acyl alaninates, and other amino acid surfactants, use a low boiling point solvent and are carried out in closed reactors under pressure, and not under atmospheric conditions. High pressure reaction conditions are inherently more dangerous, time consuming, complicated and costly and are, therefore, not desirable. Others have use high boiling solvents such as polyols, glycerol and propylene glycol, to carry out reaction at atmospheric conditions, but the difficult-to-remove solvent stays with the surfactant.

The present disclosure further relates to a process for preparation of a blend of an N-acyl alaninate surfactant and an N-acyl amino acid surfactant. The process includes combining (a) an alanine amino acid and (b) other amino acid, an anhydrous alkali salt of the other amino acid, or both, a waterless base, and a fatty alkyl ester of formula (V) to form a mixture. The mixture includes alanine amino acid salt of formula (III) and other amino acid salt of formula (IV). Formulas (III), (IV), and (V) are shown below.

(III)

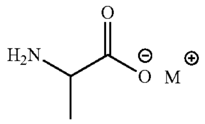

M is a cationic group selected from alkali metal salts (IV)

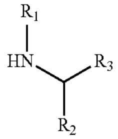

$R_1$ represents H, or $C_1$ to $C_4$ alkyl radical, $R_2$ represents H, $C_1$ to $C_4$ alkyl radical or $C_1$ to $C_4$ hydroxyalkyl, $R_3$ represents the functional moieties COOM and $CH_2$—$SO_3M$, and M is a cationic group selected from alkali metal salts (V)

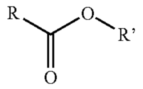

R is selected from an $C_5$-$C_{21}$ alkyl substituent and R' is a $C_1$ or higher alkyl substituent, preferably methyl.

The process further includes increasing the temperature of the mixture to 180° C. or less, preferably 160° C. or less, more preferably 150° C. or less to form a reaction mixture, continuously removing alkyl alcohol from the reaction mixture, and allowing the reaction mixture to become substantially clear to form the blend.

In embodiments, combining (a) an alanine amino acid and (b) other amino acid, an anhydrous alkali salt of the other amino acid, or both, a waterless base, and a fatty alkyl ester of formula (V) to form the mixture includes preparing a suspension of the alanine amino acid salt of formula (III) and the other amino acid salt of formula (IV) by adding the waterless base to the alanine amino acid and the other amino acid, and contacting the suspension with the fatty alkyl ester of formula (V) to form the mixture. In embodiments, the mixture includes less than about 50%, less than about 40%, less than about 35%, less than about 30%, less than about 25%, less than about 20%, less than about 15%, less than about 10%, less than about 5%, and all ranges created therein, of taurine, sodium N-methyl taurine, or both, by weight of the mixture.

In embodiments, combining (a) an alanine amino acid and (b) other amino acid, an anhydrous alkali salt of the other amino acid, or both, a waterless base, and a fatty alkyl ester of formula (V) to form the mixture includes combining the waterless base and the fatty alkyl ester of formula (V) to form a premixture and then adding (a) the alanine amino acid and (b) the other amino acid, the anhydrous alkali salt of the other amino acid, or both, to the premixture to form the mixture. In embodiments, the mixture includes at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, and all ranges created therein, of taurine, sodium N-methyl taurine, or both, by weight of the mixture.

It is contemplated that it may be beneficial to combine the waterless base and the fatty alkyl ester in the reactor prior to adding the alanine amino acid and the other amino acid (or its anhydrous alkali salt) to form in-situ the alanine amino acid salt of formula (III) and other amino acid salt of formula (IV) and achieve a well-dispersed mixture. As a non-limiting example, when the waterless base is added to a mixture comprising alanine amino acid and taurine (or sodium N-methyl taurine), where the proportion of starting taurine (or sodium N-methyl taurine) was increased to make a surfactant blend comprising 40% by weight or greater of taurate surfactant, it resulted in a slurry, thick paste, or an agglomerate-like mixture of the respective amino acid salts that was more difficult to disperse when fatty alkyl ester came in contact with it. Therefore, when the other amino acid comprises taurine (or sodium N-methyl taurine) in an amount such that the surfactant blend comprises at least about 40% taurate or N-methyl taurate surfactant by weight of the blend, it may be desirable to combine the waterless base and the fatty alkyl ester of formula (V) to form a premixture and then add the alanine amino acid and the other amino acid (or its anhydrous alkali salt) to the premixture to form the mixture. Combining the waterless base and the fatty alkyl ester of formula (V) to form the premixture before adding the alanine amino acid and the other amino acid (or its anhydrous alkali salt) may result in a more well-dispersed mixture as compared to processes where the waterless base, alanine amino acid, the other amino acid (or its anhydrous salt), and the fatty alkyl ester of formula (V) are combined together all at once or where the waterless base, alanine amino acid, and the other amino acid (or its anhydrous salt) are combined to form a suspension and then the fatty alkyl ester of formula (V) is added to the suspension.

The waterless base may comprise a $C_1$-$C_4$ alkoxide, preferably sodium or potassium methoxide and may be used in an amount within the range of 1.00 to 1.50 moles, preferably 1.02 to 1.20 moles and more preferably 1.05 to 1.10 moles per mole of the combined amino acids not neutralized, specifically reciting all values within these ranges and any ranges created thereby.

The method for preparing a homogeneous N-acyl alaninate surfactant blend further includes contacting the mixture comprising amino acid salts of formulas (III) and (IV) with a fatty alkyl ester of formula (V)

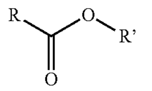

(V)

where R' is a $C_1$ or higher alkyl substituent, preferably methyl. The process may further include increasing the temperature of the two-phase mixture to 180° C., preferably 160° C., more preferably 150° C. to form a reaction mixture, continuously removing alkyl alcohol from the reaction mixture. For example, the temperature of the mixture can be from about 65° C. to about 180° C. or preferably from about 90° C. to about 150° C., specifically reciting all values within these ranges and any ranges created thereby.

Not wishing to be bound by theory, the lower melting point properties of the first N-acyl amino acid surfactant helps maintain the second higher melting N-acyl amino acid surfactant being formed melted into a more readily processable blend; thus for example the N-acyl alaninate is functioning as a solvent ("like dissolves like") for the other surfactant being formed in the reaction. According to the present disclosure the alanine amino acid is a naturally occurring α-amino acid, the unnatural amino acid (opposite 'D' stereochemistry), or the racemic mixture. Other amino acids are selected from the group consisting of sarcosine, glycine, serine, proline, taurine and N-methyl taurine.

The method according to the present disclosure can be applied successfully when alanine amino acid is combined with an anhydrous alkali metal salt form of the other amino acid. Thus, it is possible to use sodium or potassium salts of a) other natural amino acids, such as sodium glycinate and b) aliphatic amino sulfonic acids having 2 to 4 carbons such as N-methyltaurine sodium salt. Also, one skilled in the art can appreciate that either the two different amino acids (e.g. alanine and glycine) or the amino acid/anhydrous amino acid alkali metal salt combination (alanine/sodium N-methyl taurine) can be used simultaneously or sequentially during the process. One skilled in the art would recognize that when a fatty alkyl methyl ester and an alkali metal salt of amino acid are mixed together, they exist in two separate phases. Applicants have surprisingly found that under the process conditions of the present disclosure the starting materials react. As the reaction takes place to a certain degree, the mixture can become clear. Not wishing to be bound by theory, Applicants hypothesize that the surfactant being formed in the reaction facilitates bringing the reactants together until a point in which the mixture appears as a clear, one-phase mixture in which any remaining unreacted reactants have been solubilized in the reaction mixture. This appears to be important in order to achieve high reaction conversions.

Suitable waterless bases for use are those selected from the group consisting of alkali metals, such as sodium, lithium and potassium: alloys of two or more alkali metals, such as sodium-lithium and sodium-potassium alloys; alkali metal hydrides, such as sodium, lithium and potassium hydride; and the preferred alkali metal alkoxides, especially those containing from about one to about four carbon atoms such as sodium methoxide potassium methoxide, lithium methoxide sodium ethoxide, potassium ethoxide, lithium ethoxide, sodium n-propoxide, potassium n-propoxide, sodium isopropoxide, potassium isopropoxide, sodium butoxide, potassium butoxide, sodium isobutoxide, potassium isobutoxide, sodium sec-butoxide, potassium sec-butoxide, and potassium tert-butoxide. Alkoxides are available in solid form or as solutions in the alcohol from which the alkoxide derives.

The relative molar amounts wherein the alkoxide is added to step i) in an amount within the range of 1.00 to 1.50 moles, preferably 1.02 to 1.20 moles, and more preferably 1.05 to 1.10 moles per mole of combined amino acids not neutralized, specifically reciting all values within these ranges and any ranges created thereby. The alkoxide not consumed in the neutralization catalyzes the reaction between amino acid salts and the fatty alkyl ester. Thus, in the process described herein the preferred amount of alkoxide catalyst ranges from 2 to 20 mole percent, more preferably from 5 to 10 mole percent, specifically reciting all values within these ranges and any ranges created thereby.

As used herein, the terms "fatty alkyl ester(s)" and "fatty acid esters" are intended to include any compound wherein the alcohol portion is easily removed, preferably esters of volatile alcohols, e.g $C_{1-4}$ alcohols (preferably methyl).

Volatile alcohols are highly desirable. Methyl esters are the most highly preferred ester reactants. Suitable ester reactants can be prepared by the reaction of diazoalkanes and fatty acids or derived by alcoholysis from the fatty acids naturally occurring in fats and oils. Non-limiting examples are methyl octanoate (caprylate), methyl decanoate (caprate), methyl dodecanoate (laurate), methyl tetradecanoate (myristate), methyl hexadecanoate (palmitate), methyl octadecanoate (stearate), methyl oleate, ethyl dodecanoate (laurate), ethyl tetradecanoate (myristate), isopropyl dodecanoate (laurate), isopropyl tetradecanoate (myristate), and mixtures thereof. Suitable fatty acid esters can be derived from either synthetic or natural, saturated or unsaturated fatty acids. Non-limiting examples of saturated fatty acids include caprylic, capric, lauric, myristic, palmitic, and stearic. Mixtures of fatty acids derived from coconut oil, cottonseed oil, palm kernel oil, soybean oil, cotton seed oil, rapeseed oil, safflower oil, canola oil (low erucic acid), and corn oil and mixtures thereof. Most preferred is coconut oil.

It is preferred that the fatty alkyl esters be highly purified to remove color/odor materials, oxidation products, and their precursors. The free fatty acid level should be less than about 0.1%, preferably less than about 0.05%, by weight of the esters. In addition, the fatty acid alkyl esters should have the lowest level of moisture possible, since any water present will react with the alkoxide catalyst, inhibit the amidation reaction and can lead to elevated levels of soap.

The molar ratio wherein the fatty alkyl ester is added to step ii) in an amount within the range of 0.90 to 1.50 moles per mole of the combined amino acid salts, preferably from 0.95 to 1.20 moles per mole of the combined amino acid salts, or more preferably from 1.00 to 1.05 moles of the combined amino acid salts, specifically reciting all values within these ranges and any ranges created thereby. As shown in the examples, high active surfactant compositions with low levels of impurities are possible without further processing steps when the combined amino acid salts and the fatty alkyl ester are used in about equimolar amounts. Using an excess of fatty alkyl ester would result in a surfactant composition contaminated with unreacted fatty alkyl ester, thus requiring further processing for its removal. It is even less desirable to use the amino acids salts in excess since they are more expensive than the fatty alkyl ester, it does not have surface active properties and it would be difficult and costly to recover the unreacted amino acid salts from the surfactant mixture.

Surprisingly the reaction between the mixture of alanine salt of formula (III) and other amino acid salt of formula (IV) and fatty alky ester of formula (V) can be performed at atmospheric pressure while continuously distilling off alkyl alcohol (e.g. methanol) from the reaction mixture. The temperature conditions for the amidation reaction may range from 65° C. to about 180° C. or preferably from about 90° C. to about 150° C., specifically reciting all values within these ranges and any ranges created thereby. Reaction progress can be monitored by tracking the amount of alkyl alcohol collected and/or by quantitative $^1$H NMR, or other analytical techniques. The final homogeneous reaction mixture of N-acyl alaninate surfactant blends, made under these relatively mild conditions, can be fluid at the amidation reaction temperature. The high active surfactant can be flaked, prilled, grinded, pelletized, and/or made into beads, noodles, needles, and ribbons by known methods to those skilled in the art.

The reaction may utilize an inert gas headspace to help reduce the level of oxygen available during the reaction. The reduced level of oxygen helps to reduce the amount of oxidation of the constituents of the reaction. Oxidation of the constituents can cause discoloration. A suitable example of an inert gas that may be utilized is nitrogen.

Additionally, the benefit of performing the reaction described herein at atmospheric or even negative pressure is that the resultant surfactant can be (if desired) substantially free of any solvents. Additionally, the alkyl alcohol, e.g. methanol, vapors can be condensed and recovered outside of the reactor. This collection of alkyl alcohol vapors can be re-used to make more methyl esters. The resultant surfactant can have a reduced amount of fatty acid methyl ester compared to conventional processes.

Additionally, the inventors have surprisingly found that depending on the makeup of the blended surfactant the amount of fatty acid methyl ester in the resultant composition can vary. For example, where the surfactant blend comprises at least about 60% by weight of alaninate and about 25% by weight or less of taurate can yield high levels of surfactant in the resultant composition, e.g. about 85% by weight or greater, from the process of the present disclosure. Similarly, with high levels of alaninate, e.g. at least about 60% by weight, the levels of fatty acid methyl ester in the resultant surfactant can be less than about 5% by weight or more preferably less than about 3% by weight, specifically reciting all values within these ranges and any ranges created thereby.

In contrast, where the alaninate is present at about 35% by weight or less and taurate is present at about 40% by weight or greater, the yield of surfactant in the resultant composition may be about 75% by weight or greater. Additionally, in this configuration, the levels of fatty acid methyl ester in the resultant composition may be about 15% by weight, preferably less than about 10% by weight or more preferably less than 5% by weight, specifically reciting all values within these ranges and any ranges created thereby.

This same principle is believed to be applicable for other blends of alaninate with taurate or N-methyl taurate. For the process of the present disclosure, the weight percentage of taurate or N-methyl taurate can be from about 60% by weight or less, preferably from about 40% by weight or less or more preferably 30% by weight or less. For example, the weight percentage of taurate or N-methyl taurate can be from about 5% by weight to about 60% by weight, preferably from about 5% by weight to about 40% by weight or more preferably from about 5% by weight to about 30% by weight, specifically reciting all values within these ranges and any ranges created thereby.

In contrast, for the process of the present disclosure, the weight percentage of alaninate independently or in conjunction with glycinate, sarcosinate, serinate, prolinate, or combinations thereof, can be about 40% by weight or greater, preferably 60% by weight or greater or more preferably 70% by weight or greater. For example, the weight percentage of the alaninate independently or in conjunction with glycinate, sarcosinate, serinate, prolinate or combinations thereof, can be from between about 40% by weight to about 90% by weight, preferably from about 60% by weight to about 90% by weight or more preferably from about 70% by weight to about 90% by weight, specifically reciting all values within these ranges or any ranges created thereby.

In order to make a pumpable surfactant composition (pumpable at 50° C. or below), the active surfactant without any further purification may be diluted into water in an amount of from 20 to 70 wt. percent of the high active surfactant, and preferably from about 25 to about 50 wt. percent of the high active surfactant. Alternatively, the water may be added to the high active surfactant at temperatures preferably below 120° C., more preferably under 100° C. under good mixing. The amount of water needed will depend on target surfactant active level, target viscosity and the solubility behavior of the surfactant. The solid form of the surfactant—powder, flakes, pellets, beads, needles, noodles—may also be dissolved in water to make a pumpable surfactant composition for formulators to easily incorporate in cleaning formulations.

The process of the present disclosure minimizes the level of acylated di- and tri-peptide by-products and soap formed by using low catalyst loading, excluding water from the amidation reaction and by gradually increasing reaction temperature from 90° C. to about 150° C.

The process of the present disclosure can be carried out as batch, semicontinuous, or in a continuous mode using suitable reactor(s) configurations. A conventional stirred-tank batch reactor equipped with a means for heating the reaction, a vapor column and condenser for collecting volatile alkyl alcohol, an efficient stirrer capable of stirring the reaction product mixture, a means for blanketing the reactor contents with nitrogen, and optionally a vacuum system capable of achieving a vacuum of less than 20 mm of Hg may be used to prepare the homogeneous N-acyl alaninate surfactant blend composition disclosed herein.

Other reactors useful in the present disclosure is appropriately an apparatus with which liquid and solid mixtures of liquid and solid substances can be mixed using shear forces. In a static housing, the movement of the reaction mixture are brought about by internal mechanical stirring or mixing devices. The reaction apparatus can be a kneader or mixer equipped with sigma blades, masticator blades, or plough type agitator. Additional useful apparatuses include horizontal or vertical forced mixers equipped with mixing tools, for example sigma blades, masticator blades, plough type agitator, or throwing paddles, in combination with a cutting rotor.

Suitable horizontal forced mixers are those equipped with mixing tools or combinations of mixing tools such as, for example, sigma blades, masticator blades, or plough type agitator, in combination with a cutting rotor installed in the drum; more preferably horizontal forced mixers operating at a Froude number between 0.1 and 6, preferably between 0.25 and 5 and more preferably between 0.4 and 4, and equipped with mixing tools, or combinations of mixing tools, such as, for example sigma blades, masticator blades and plough type agitator in combination with a cutting rotor installed in in the drum. Without wishing to be bound by theory, in the treatment of mixing processes, the Froude number, Fr, plays a major role. This dimensionless quantity is indicative of the relationship between the forces of inertia and gravity acting on a moving particle. The following equation is applicable here:

$$Fr=v^2/rg$$

where:
v=peripheral speed [m/s]
r=radius of mixing drum [m]
g=acceleration of gravity [m/s$^2$]

$$v=\pi\times D\times n/60$$

where:
D=diameter of mixing drum [m]
N=rotation rate of shaft [rpm]

The homogeneous N-acyl alaninate surfactant blend process described herein has a number of advantages over known commercial manufacturing processes and include:

1) High conversion and yields can be achieved while avoiding laborious purification steps and concomitant product loss.
2) Fewer chemical engineering unit operations that can result in significant reduction in energy consumption.
3) Free of toxic and hazardous reagents, as described herein, and therefore the issue of handling these materials does not arise.
4) The resulting surfactant product is substantially free of solvents that would otherwise need to be removed through additional post-reaction processing steps.
5) Homogeneous blends of mild surfactants composed of N-acyl alaninate and other N-acyl amino acid surfactant are produced from the same starting fatty alkyl ester raw material via one reaction and in the same reactor.
6) Low cost and efficient way to manufacture a homogeneous blend of mild surfactants in solid form composed of N-acyl alaninate and other N-acyl amino acid surfactant. Solid form (free of water) of mild surfactants are advantageous for some applications.
7) Low cost and efficient way to manufacture an aqueous concentrate composed of a homogeneous blend of mild surfactants composed of N-acyl alaninate and other N-acyl amino acid surfactant made via one reaction and in the same reactor.
8) Avoids using alternate manufacturing processes to separately make acyl N-methyl taurates and acyl taurates surfactant needed in blended cleansing compositions. These processes either generate salt (NaCl) via Schotten Baumann chemistry or require very high temperatures when using excess fatty acid (that needs to be removed) via direct amidation reaction.

Applications and Uses

In another aspect, the present disclosure is directed to a consumer product cleaning or personal care composition comprising about 0.001 wt. % to about 99.999 wt. %, preferably about 0.1 wt % to about 80 wt. % of the homogeneous N-acyl alaninate surfactant blend, as described herein, based on the total weight of the composition, and 0.001 wt. % to about 99.999 wt. % of one or more additional cleaning components, or one or more additional personal care components. In various embodiments, the at least one cleaning component is selected from the group consisting of a surfactant, an enzyme, a builder, an alkalinity system, an organic polymeric compound, a hueing dye, a bleaching compound, an alkanolamine, a soil suspension agent, an anti-redeposition agent, a corrosion inhibitor, and a mixture thereof. In some cases, the composition is selected from the group consisting of a granular detergent, a bar-form detergent, a liquid laundry detergent, a liquid hand dishwashing composition, a hard surface cleaner, a tablet, a disinfectant, an industrial cleaner, a highly compact liquid, a powder, and a decontaminant. In a class of cases, the composition is enclosed within a sachet or a multi compartment pouch comprising both solid and liquid compartments.

In some embodiments, the at least one personal care component is selected from the group consisting of an oil, and emollient, a moisturizer, a carrier, an extract, a vitamin, a mineral, an anti-aging compound, a surfactant, a solvent, a polymer, a preservative, an antimicrobial, a wax, a particle, a colorant, a dye, a fragrance, and mixtures thereof. In various cases, the composition is a shampoo, a hair conditioner, a hair treatment, a facial soap, a body wash, a body soap, a foam bath, a make-up remover, a skin care product, an acne control product, a deodorant, an antiperspirant, a shaving aid, a cosmetic, a depilatory, a fragrance, and a mixture thereof. In a class of cases, the composition is delivered in a form selected from the group consisting of a wipe, a cloth, a bar, a liquid, a powder, a creme, a lotion, a spray, an aerosol, a foam, a mousse, a serum, a capsule, a gel, an emulsion, a doe foot, a roll-on applicator, a stick, a sponge, an ointment, a paste, an emulsion spray, a tonic, a cosmetic, and mixtures thereof. In various embodiments, the composition further comprises a product selected from the group consisting of a device, an appliance, an applicator, an implement, a comb, a brush, a substrate, and mixtures thereof. In some embodiments, the composition is dispensed from an article selected from the group consisting of a bottle, ajar, a tube, a sachet, a pouch, a container, a tattle, a vial, an ampoule, a compact, a wipe, and mixtures thereof.

EXAMPLES

Examples 1, 2, and 3 demonstrate the synthesis/preparation/manufacture of homogeneous sodium N-acyl alaninate surfactant blends in greater than 85%, by weight, substantially free of solvent and sodium chloride (NaCl).

Analysis of the Reactions Conducted by a $^1$H NMR Method.

In a scintillation vial reaction product and (internal standard, IS) were weighed out in a precision balance (0.1 mg readability). $D_2O$ (deuterium oxide) was added to the vial to fully dissolve sample and internal standard. The quantitative $^1$H NMR spectra were recorded at 600 MHz using standard $^1$H pulse sequence, pulse width of 12.00, 60 sec delay, and a 2.59 sec acquisition time. NMR data was processed using MestReNova 10.0.2. The integration of the peak at δ4.15 ppm for the methine (—CH—) group was used to calculate the wt. % of N-acyl alaninate surfactant. The integration of the peaks at 3.56 and 3.08 ppm for the methylene groups (—CON(H)—$CH_2$—$CH_2$—$SO_3Na$) was used to calculate the wt. % of taurate surfactant. The integration of the peaks at 3.79 and 3.72 ppm for the methylene group (—$CH_2$—$SO_3Na$) was used to calculate the wt. % of N-methyl taurate surfactant. The integration of the peaks at 3.74 ppm for the methylene group (—CON(H)—$CH_2$—COONa) was used to calculate the wt. % of glycinate surfactant. The integration of the triplet at δ2.16 ppm for the methylene (—$CH_2$—) adjacent to the carboxyl group was used to calculate the wt. % of fatty acid soap. The integration of the peak at δ3.30 ppm for the methine (—CH—) group was used to calculate the wt. % of unreacted alanine sodium salt. The integration of a singlet at δ3.65 ppm for the methyl ($CH_3$—) was used to calculate the wt. % of any residual fatty alkyl methyl ester. The integrations were compared to the integration region of the IS and used for the calculations. The wt. % of each species was calculated using the following equation:

$$Wt.\ \%\ (y) = \frac{A(y)}{A(IS)} \times \frac{n(IS)}{n(y)} \times \frac{MW(y)}{MW(IS)} \times \frac{W(IS)}{W(y)} \times P(IS)$$

Wt. % (y)=weight percent of "y" species in the sample
A=NMR integration
n=number of protons
MW=molecular weight
P=purity of the internal standard

Example 1

Synthesis of a Blend of Sodium Lauroyl/Myristoyl Alaninate and Sodium Lauroyl/Myristoyl Taurate A glass reactor vessel was used to carry out a series of experiments. It was fitted with a stirring rod with Teflon blade, a Dean-Stark trap equipped with a condenser, a nitrogen inlet, an addition funnel, and a thermocouple connected to a temperature control device. The reactor was heated by a heating mantle plugged into the temperature control device. The reactor was charged with L-alanine (80.99 g, 0.90 mole) and taurine (2-aminoethane sulfonic acid; 33.20 g, 0.26 mole) and 25 wt. % sodium methoxide solution (276.52 g, 1.28 mol). The contents of reactor were heated to 65-68° C. under nitrogen and stirring. At this point CE1270 (257.00 g, 1.16 mole)—a product of P&G Chemicals, methyl laurate/methyl myristate mixture—was added to the reactor (30-40 min) from the addition funnel while maintaining good mixing, and the temperature set to 100° C. Methanol evaporated was collected in the Dean-Stark. The temperature of the reaction was increased gradually to 125° C., after it reached 100° C. The initial two-phase reaction became one-phase during this time, and the reaction was considered complete when methanol stopped condensing, 2.5 h. The molten product was poured out of the reactor and cooled to ambient temperature. The composition of the slightly yellow glassy product analyzed by quantitative $^1$H NMR (qNMR) was 61.7% sodium lauroyl/myristoyl alaninate, 23.4% sodium lauroyl/myristoyl taurate, 7.2% fatty acid soap, 4.1% sodium alaninate, 0.7% taurine sodium salt, 1.0% lauroyl/myristoyl methyl ester, and 0.4% methanol.

Example 2

Synthesis of a Blend of Sodium Lauroyl/Myristoyl Alaninate and Sodium N-Methyl Lauroyl/Myristoyl Taurate A glass reactor vessel was used to carry out a series of experiments. It was fitted with a stirring rod with Teflon blade, a Dean-Stark trap equipped with a condenser, a nitrogen inlet, an addition funnel, and a thermocouple connected to a temperature control device. The reactor was heated by a heating mantle plugged into the temperature control device. The reactor was charged with L-alanine (80.99 g, 0.90 mol) and dry sodium N-methyl taurine (2-methyl-aminoethane sulfonic acid sodium salt; 43.80 g, 0.27 mole) and 25 wt. % sodium methoxide solution (213.95 g, 0.99 mole). The contents of reactor were heated to 65-68° C. under nitrogen and stirring. At this point CE1270 (259.21 g, 1.17 mole)—a product of P&G Chemicals, methyl laurate/methyl myristate mixture—was added to the reactor (~50 min) from the addition funnel while maintaining good mixing, and the temperature set to 90° C. Methanol evaporated was collected in the Dean-Stark. The temperature of the reaction was increased gradually to 125° C., after it reached 90° C. The initial two-phase reaction became one-phase during this time, and the reaction was considered complete when methanol stopped condensing, 6.5 h. The molten product was poured out of the reactor and cooled to ambient temperature. The composition of the clear, glassy product analyzed by quantitative $^1$H NMR (qNMR) was 71.1% sodium lauroyl/myristoyl alaninate, 20.7% sodium N-methyl lauroyl/myristoyl taurate, 5.0% fatty acid soap, 1.2% sodium alaninate, 1.0 lauroyl/myristoyl methyl ester and 0.2% methanol.

Example 3

Synthesis of a Blend of Sodium Lauroyl/Myristoyl Alaninate and Sodium Lauroyl/Myristoyl Glycinate A glass reactor vessel was used to carry out a series of experiments. It was fitted with a stirring rod with Teflon blade, a Dean-Stark trap equipped with a condenser, a nitrogen inlet, an addition funnel, and a thermocouple connected to a temperature control device. The reactor was heated by a heating mantle plugged into the temperature control device. The reactor was charged with L-alanine (89.09 g, 1.00 mol) and glycine (26.28 g, 0.35 mole) and 25 wt. % sodium methoxide solution (319.98 g, 1.49 mole). The contents of reactor were heated to 65-68° C. under nitrogen and stirring. At this point CE1270 (299.05 g, 1.35 mole)—a product of P&G Chemicals, methyl laurate/methyl myristate mixture—was added to the reactor (~45 min) from the addition funnel while maintaining good mixing, and the temperature set to 90° C. Methanol evaporated was collected in the Dean-Stark. The temperature of the reaction was increased gradually to 125° C., after it reached 90° C. The initial two-phase reaction became one-phase during this time, and the reaction was considered complete when methanol stopped condensing, 3.25 h. The molten product was poured out of the reactor and cooled to ambient temperature. The composition of the clear, light yellow, glassy product analyzed by quantitative $^1$H NMR (qNMR) was 67.2% sodium lauroyl/myristoyl alaninate, 24.2% sodium lauroyl/myristoyl glycinate, 5.1% fatty acid soap, 2.4% sodium alaninate, 0.1 lauroyl/myristoyl methyl ester, and 1.3% methanol.

Examples 4 and 5 demonstrate the synthesis/preparation/manufacture of Sodium Cocoyl Alaninate and Sodium Cocoyl Taurate blends containing >25 wt % taurate surfactant, substantially free of solvent and sodium chloride (NaCl).

Example 4

In a horizontal forced mixer which has been equipped with plough type agitator, a distillation column and an inert gas inlet, coco fatty acid methyl ester (1284.3 g, 6.0 mol) and sodium methoxide solution (1367.7 g, 6.4 mol) were loaded into the reactor under a nitrogen blanket. Solid L-alanine (281.4 g, 3.2 mol) and solid taurine (351.7 g, 2.8 mol) were then added while the mixer was mixing at a Froude number of 0.8 and at a temperature of 25-30° C. The temperature of the reaction mixture was gradually increased to 159° C. over the course of several hours. The alcohol from the base and alcohol formed during the reaction were removed by distillation from the mixer. The reaction was considered complete when methanol no longer was collecting. Heating was then turned off, and the mixer was cooled down to about 25-30° C. while shaft-plough elements continued to mix reaction product. A white broken-up-grinded product was discharged at ambient temperature from the mixer through a bottom port, 1767.2 g. Quantitative $^1$H NMR (qNMR) analysis of the solid after grinding it gave the following composition: 44.0% sodium cocoyl taurate, 33.2% sodium cocoyl alaninate, 5.4% soap, and 6.1% fatty acid methyl ester.

Example 5

In a horizontal forced mixer which has been equipped with plough type agitator, a distillation column and an inert gas inlet was charged with sodium methoxide solution (1362.4 g, 6.4 mol) under a nitrogen blanket. Solid L-alanine (145.2 g, 1.6 mol) was then added at a temperature of 25-30° C. while the mixer was mixing at a Froude number of 0.8. After 10 min, coco fatty acid methyl ester (1284.3 g, 6.0 mol) and solid taurine (543.2 g, 4.3 mol) were loaded into the reactor. The temperature of the reaction mixture was gradually increased to 160° C. over the course of several hours. The alcohol from the base and alcohol formed during the reaction were removed by distillation from the mixer. The reaction was considered complete when methanol no longer was collecting. Heating was then turned off, and the mixer was cooled down to about 25-30° C. while shaft-plough elements continued to mix reaction product. A white broken-up-grinded product was discharged at ambient temperature from the mixer through a bottom port; 1883.9 g. Quantitative $^1$H NMR (qNMR) analysis of the solid after grinding it gave the following composition: 58.6% sodium cocoyl taurate, 19.4% sodium cocoyl alaninate, 4.9% soap, and 5.7% fatty acid methyl ester.

Examples 6-11

Examples 6-11 in Table 1 below show the ingredient lists for personal care products, e.g. shampoo, body wash and the like.

| | Examples, active wt % | | | | | |
|---|---|---|---|---|---|---|
| Ingredients | 6 | 7 | 8 | 9 | 10 | 11 |
| Sodium Cocoyl Alaninate [1, 2] | 2.0 | 1.0 | 1.0 | 2.0 | 3.0 | 2.0 |
| Sodium Cocoyl Taurate [1] | 2.0 | — | 7.0 | — | 1.0 | — |
| Sodium Methyl Cocoyl Taurate [2] | — | 4.0 | — | 6.0 | — | 10.0 |
| Disodium Laureth Sulfosuccinate [3] | 8.0 | — | — | — | — | — |
| Sodium Cocoyl Isethionate [4] | — | 3.5 | — | — | 6.0 | — |
| Lauramidopropyl Betaine [5] | — | 4.4 | — | — | 9.8 | — |
| Cocamidopropyl Betaine [6] | 2.0 | 5.4 | 8.0 | 8.0 | — | — |
| Coco-betaine [7] | — | — | — | — | — | 4.0 |
| Polyquaternium 10 [8] | 0.35 | — | — | — | — | — |
| Polyquaternium 10 [9] | — | — | — | — | 0.80 | — |
| Polyquaternium 10 [10] | — | 0.55 | 0.25 | — | — | — |
| Polyquaternium 6 [11] | 0.20 | — | — | 0.25 | — | — |
| Guar Hydroxypropyltrimonium Chloride [12] | — | — | — | — | — | 0.50 |
| Tetrasodium EDTA [13] | 0.16 | 0.16 | 0.16 | 0.16 | 0.16 | 0.16 |
| Sodium Benzoate [14] | 0.25 | 0.25 | 0.25 | 0.25 | 0.50 | 0.25 |
| Sodium Salicylate [15] | — | 0.25 | 0.25 | — | 0.50 | — |
| Methylchloroisothiazolinone and Methylisothiazolinone [16] | 0.0005 | — | — | 0.0005 | — | 0.0005 |

-continued

| | Examples, active wt % | | | | | |
|---|---|---|---|---|---|---|
| Ingredients | 6 | 7 | 8 | 9 | 10 | 11 |
| Perfume | 2.0 | 0.90 | 1.1 | 0.85 | 1.2 | 1.0 |
| Citric Acid [17] | to pH 6.0 | to pH 5.0 | to pH 5.2 | to pH 6.0 | to pH 5.7 | to pH 6.5 |
| Water | Q.S. | Q.S. | Q.S. | Q.S. | Q.S. | Q.S. |

[1] Sodium Cocoyl Alaninate and Sodium Cocoyl Taurate blend made according to the present disclosure.
[2] Sodium Cocoyl Alaninate and Sodium Methyl Cocoyl Taurate blend made according to the present disclosure.
[3] Chemccinate DSLS from Lubrizol
[4] Jordapon CI Prill from BASF
[5] Mackam DAB ULS from Solvay
[6] Amphosol HCA-HP from Stepan
[7] Dehyton AB 30 from BASF
[8] UCARE Polymer JR-30M from Dow
[9] UCARE Polymer LR-30M from Dow
[10] UCARE Polymer KG-30M from Dow
[11] Flocare C 106 MSS available from SNF
[12] Jaguar Excel from Solvay
[13] Versene 220 from Dow
[14] Sodium benzoate from Emerald Kalama Chemical
[15] Sodium salicylate from JQC (Huayin) Pharmaceutical
[16] Kathon CG from Dow
[17] Citric acid from ADM Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any present disclosure disclosed or claimed herein or that it alone, or in any combination with any other reference or references, teaches, suggests or discloses any such present disclosure. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this present disclosure.

What is claimed is:

1. A surfactant composition comprising a homogeneous mixture of greater than 70%, by weight, of N-acyl alaninate surfactant of formula (I)

(I)

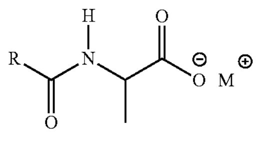

and an N-acyl amino acid surfactant of formula (II)

(II)

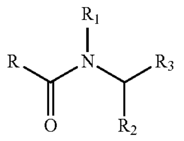

wherein R is an $C_5$-$C_{21}$ alkyl substituent, $R_1$ represents H, $R_2$ represents H, $C_1$ to $C_4$ alkyl radical, or $C_1$ to $C_4$ hydroxyalkyl, $R_3$ represents the functional moieties COOM and $CH_2$—$SO_3M$, and M is a cationic group selected from the group consisting of alkali metal salts and hydrogen, wherein the surfactant composition is substantially free of solvent and NaCl.

2. The surfactant composition of claim 1, wherein the alkyl substituent is saturated.

3. The surfactant composition of claim 1, wherein the alkyl substituent is unbranched.

4. The surfactant composition of claim 1, wherein R is a $C_{7-17}$ alkyl substituent.

5. The surfactant composition of claim 1, wherein the surfactant composition is substantially free of polyol solvents and water.

6. The surfactant composition of claim 1, comprising greater than 70% of the mixture of N-acyl alaninate surfactant of formula (I) and N-acyl amino acid surfactant of formula (II) combined, by weight of the composition.

7. The surfactant composition of claim 1, further comprising:

less than 2%, by weight, of an N-acyl amino acid dipeptide salt, tri-peptide salts, or combinations thereof; and from 0 to 1%, by weight, of an alkyl alcohol (R'OH), wherein R' is a Cor higher alkyl substituent.

8. The surfactant composition of claim 1, comprising less than about 5% of fatty acid methyl ester by weight of the surfactant composition when the surfactant composition comprises at least about 60% of N-acyl alaninate by weight of the surfactant composition.

9. The surfactant composition of claim 1, comprising less than about 15% of fatty acid methyl ester by weight of the surfactant composition when the surfactant composition comprises about 35% or less N-acyl alaninate by weight of the surfactant composition.

10. The surfactant composition of claim 1, wherein the surfactant composition is a solid or in solution.

11. The surfactant composition of claim 1, wherein the surfactant composition is selected from the group consisting of a powder, granule, flake, noodle, needle, extrudate, ribbon, bead and pellet and mixtures thereof.

12. The surfactant composition of claim 1, wherein said surfactant composition is a form selected from the group consisting of a granular detergent, a bar-form detergent, a liquid laundry detergent, a gel detergent, a single-phase or multi-phase unit dose detergent, a detergent contained in a single-phase or multi-phase or multi-compartment water soluble pouch, a liquid hand dishwashing composition, a laundry pretreat product, a surfactant contained on or in a porous substrate or nonwoven sheet, an automatic dishwashing detergent, a hard surface cleaner, a fabric softener composition, a personal care composition and mixtures thereof.

* * * * *